United States Patent
Zhang et al.

(10) Patent No.: US 10,341,792 B1
(45) Date of Patent: Jul. 2, 2019

(54) SYSTEM FOR DISTRIBUTING AUDIO OUTPUT USING MULTIPLE DEVICES

(71) Applicant: AMAZON TECHNOLOGIES, INC., Seattle, WA (US)

(72) Inventors: Shengwei Zhang, Fremont, CA (US); Jin Guo, Cupertino, CA (US); Alexander Feldman, San Ramon, CA (US); Ashish Shukla, Milpitas, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 25 days.

(21) Appl. No.: 15/357,579

(22) Filed: Nov. 21, 2016

(51) Int. Cl.
  *G06F 3/16* (2006.01)
  *H04R 27/00* (2006.01)
  *H04R 29/00* (2006.01)

(52) U.S. Cl.
  CPC ............ *H04R 27/00* (2013.01); *G06F 3/165* (2013.01); *H04R 29/007* (2013.01); *H04R 2227/003* (2013.01)

(58) Field of Classification Search
  CPC .............. H04R 27/00; H04R 29/007; H04R 2227/003; H04R 2227/005; G06F 3/165
  USPC ........................................................ 381/85
  See application file for complete search history.

(56) References Cited

U.S. PATENT DOCUMENTS

| | | | |
|---|---|---|---|
| 2006/0013208 A1* | 1/2006 | Rietschel | H04J 3/0664 370/389 |
| 2007/0038999 A1* | 2/2007 | Millington | H04J 3/0664 718/100 |
| 2009/0171487 A1* | 7/2009 | Wilhelm | G11B 27/10 700/94 |
| 2014/0244013 A1* | 8/2014 | Reilly | G06F 3/165 700/94 |
| 2015/0205805 A1* | 7/2015 | Gossain | H04R 27/00 381/81 |
| 2017/0098466 A1* | 4/2017 | Elliot | G11B 27/10 |

OTHER PUBLICATIONS

Speakman et al., "PGM Reliable Transport Protocol Specification", Dec. 2001, RFC 3208, pp. 1-111.*

* cited by examiner

*Primary Examiner* — Davetta W Goins
*Assistant Examiner* — Daniel R Sellers
(74) *Attorney, Agent, or Firm* — Lindauer Law, PLLC (57) ABSTRACT

Described are techniques for distributing audio data to multiple audio devices for generation of a synchronized audio output. A master device may receive audio data from a content server or other remote data source and store the audio data in a local cache. The master device may provide the audio data to multiple slave devices using a single multicast transmission. In some cases, the master device may also provide the audio data to individual slave devices unable to receive the multicast transmission using a network connection. Each slave device may store the audio data in a local cache. To generate the audio output, each audio device may retrieve the audio data from the associated local cache, which may enable the audio data to be distributed without modifying the commands used by audio applications to generate the audio output.

20 Claims, 6 Drawing Sheets

SYSTEM FOR DISTRIBUTING AUDIO OUTPUT USING MULTIPLE DEVICES

BACKGROUND

When providing a synchronized audio output using a group of networked devices, the particular devices that may be used may be limited by the characteristics of the network, such as limited bandwidth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Audio systems may include multiple audio devices, in communication with one another via one or more networks, to provide a synchronized audio output to users within an environment. In some cases, a user may select a particular group of audio devices to be used, such as a set of audio devices within a particular room of a home, or all of the audio devices located on a particular floor of the home. The user may also select a particular audio application for use or particular audio content for output. Based on the location and other characteristics of each audio device, the timing and volume of the audio output for each audio device may be configured. For example, a time delay between various audio streams provided to different devices may be used to synchronize the audio output. As another example, different devices may be used to provide audio output at different volumes based on distance from a listening position, different channels of a surround-sound output, and so forth.

However, the number of audio devices that may be used to generate an audio output, the particular audio devices that may be used, and the quality of the audio output may be affected by characteristics of the network(s) by which the devices communicate, and by characteristics of the devices themselves. For example, a home Wi-Fi network may only support simultaneous use of four audio devices due to the limited bandwidth of the network. Continuing the example, to initiate an audio output, each audio device may receive audio data from a server or other remote data source via a communication link with an access point. Providing multiple copies of the same audio data to a large number of audio devices using the access point may inefficiently utilize network resources, limiting the number of devices that may be used to generate the output.

Described in this disclosure are techniques for distributing audio data to a group of audio devices in a manner that may reduce the network resources used to generate an audio output. Responsive to a control command from a user device or a server, a group of audio devices may be formed. For example, a control command may be provided to one or more audio devices from a user device, such as a smartphone, tablet computer, remote control, or other type of computing device, in communication with a master device, such as using a Wi-Fi or Bluetooth connection. As another example, a control command may be received, by the master device or other devices in communication therewith, from a remote device, such as a server. Continuing the example, a user device, such as a desktop computer, laptop computer, tablet computer, or wearable computer may be used to provide input to the server, which may in turn provide a control command to the master device.

The control command may include an indication of audio data to be used to generate an output, an audio application to be executed, one or more audio devices to be used to generate the output, and so forth. Based on the control command, one or more groups of audio devices may be formed. A particular audio device may be selected as a master device, which may receive the audio data from a remote data source and distribute the audio data to other devices in the group (e.g., "slave devices"). In some cases, one or more slave devices may communicate with the master device via a shared connection to an access point. For example, the master device may receive audio data from the remote data source, and one or more slave devices may provide a request for the audio data to the master device, rather than to the remote data source. The master device may then provide the audio data to the slave devices via the shared connection to the access point. Example implementations for forming a group of audio devices associated with an access point are described in U.S. patent application Ser. No. 15/245,897, filed Aug. 24, 2016, entitled "System for Configuring Distributed Audio Output Using an Access Point", which is incorporated by reference herein in its entirety.

To reduce the network resources used to distribute the audio data to multiple audio devices, the number of duplicate copies of the audio data provided using the network may be reduced. For example, in some implementations, a master device may be used to transmit a single copy of the audio data to multiple slave devices using a multicast transmission. A multicast transmission may include a transmission of a data stream to a group address, which may be received by multiple devices within range of the transmission that have elected to receive data at the group address, such as through use of a multicast receiver. Example implementations for forming a group of audio devices in which a master device distributes audio data to multiple slave devices are described in U.S. patent application Ser. No. 15/246,070, filed Aug. 24, 2016, entitled "System for Configuring Distributed Audio Output Using a Designated Audio Device", which is incorporated by reference herein in its entirety. Decreasing the network resources used to provide audio data to various devices, such as by using one or more multicast transmissions, may increase the number of audio devices that may be used to generate an audio output. For example, if four copies of the audio data may be provided to twelve audio devices using four multicast transmissions, this distribution of audio data may consume a similar quantity of network resources compared to the individual distribution of four copies of the audio data to four audio devices using a shared connection to an access point.

Responsive to the control command, a master device of the group of audio devices may provide, to an audio data source such as one or more servers or other types of computing devices, a request for the audio data associated with the control command. The master device may receive the requested audio data and store the audio data in a local cache or other type of storage medium accessible to the master device. The master device may then provide the audio data to a plurality of slave devices using a multicast transmission. In other implementations, a first audio device may receive the audio data from the audio data source, then provide the audio data to a second audio device, which acts as the master device and transmits the audio data to a plurality of slave devices. In some cases, one or more slave devices may be unable to receive the multicast transmission. For example, a particular slave device may lack a multicast receiver or may be positioned beyond the range of the multicast transmission or at a location where receipt of the multicast transmission is impeded. In such cases, the particular slave device may provide a request for the audio data to the master device using a shared connection to one or more local access points, responsive to which the master device may provide the audio data to the particular slave device via the access point(s).

One or more of the slave devices may also receive the control command, either from a user device, the master device, a server, or other remote computing device. Responsive to the control command, a slave device may activate a multicast receiver then receive, using the multicast receiver, the audio data from the master device. Each slave device that receives the audio data from the multicast transmission may store the audio data in a respective local cache accessible to the slave device.

To generate the audio output, the master device and each slave device may retrieve at least a portion of the audio data from the respective local cache or other storage medium, then produce the audio output based on the retrieved audio data. Use of a local cache or other storage media to store audio data received from a multicast transmission may enable the techniques described herein to be seamlessly integrated within existing systems. For example, an existing audio application may cause an audio device to, responsive to a control command, request and receive audio data from a remote data source, then begin generating an output using the audio data. As such, the existing application configures the audio device to request the data from another location using a "pull" method, such as a HTTP "get" or "fetch" command. In contrast, transmission of audio data from a master device to a slave device via a multicast transmission constitutes a "push" method for distributing the audio data. Use of the local cache or other storage media may enable a slave device to retrieve the audio data and begin generating an output using the same "pull" command that would normally be generated by an audio application, by simply modifying the destination from which the audio data is retrieved. For example, rather than executing a HTTP get command to retrieve audio data from a remote data source, the HTTP get command may be configured to retrieve the audio data from the local cache associated with a particular slave device.

While implementations in this disclosure describe use of audio devices to produce an audio output based on audio data, in other implementations, techniques described herein may be used to produce other types of outputs using other types of devices and other types of data. For example, video data may be provided to one or more groups of video devices using techniques described herein for generation of a video output using multiple devices.

Figure 1:
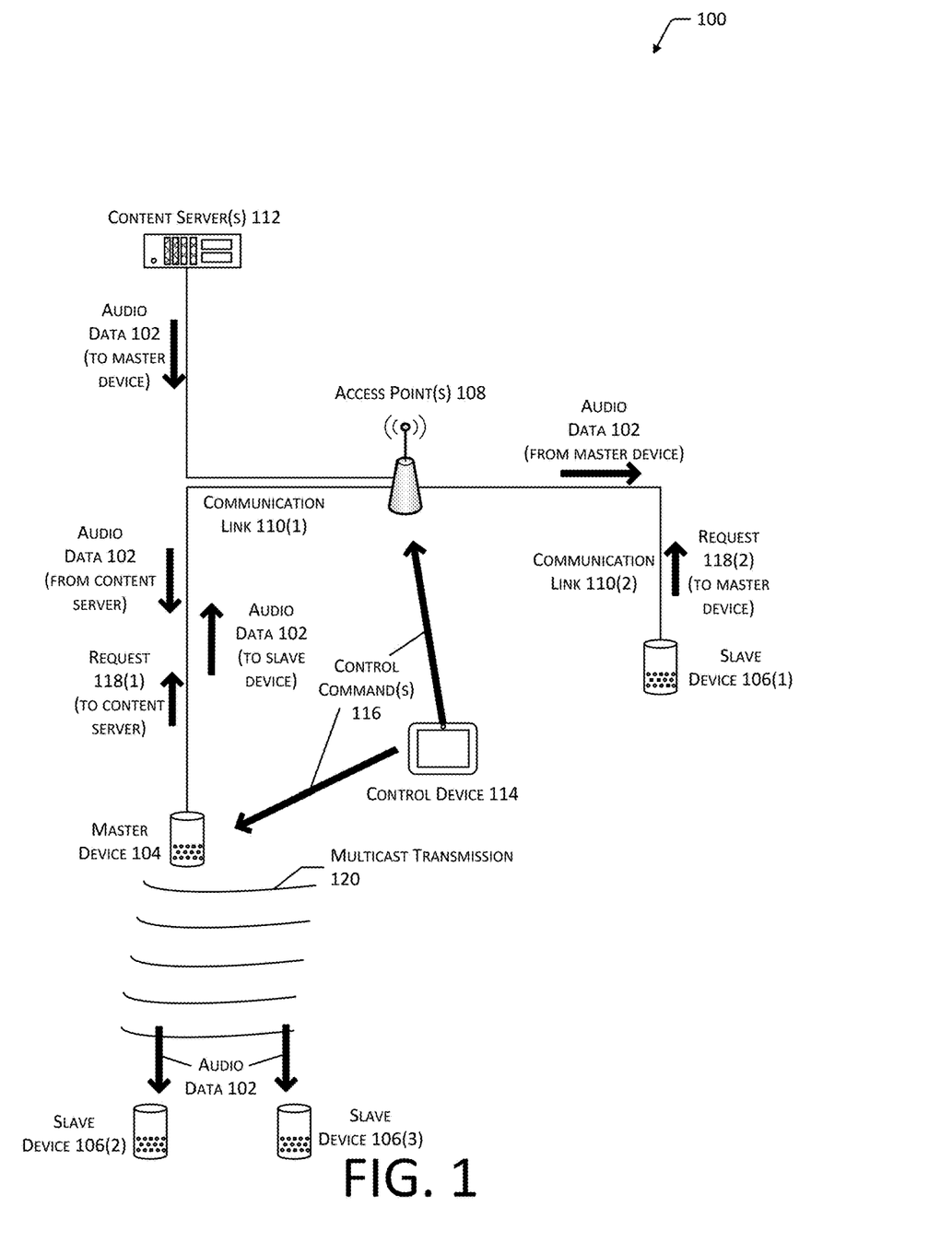
FIG. 1 depicts an implementation of a system for distributing audio data to a group of audio devices for generation of an audio output.

FIG. 1 depicts an implementation of a system 100 for distributing audio data 102 to a group of audio devices for generation of an audio output. The group of audio devices may include a master device 104 and one or more slave devices 106. While FIG. 1 depicts three slave devices 106, other implementations may include any number of slave devices 106. The audio devices may include any type of computing device capable of generating an audio output including, without limitation, a smartphone, a tablet computer, a personal computer, a wearable computer, an automotive computer, a networked speaker, a television, and so forth. The audio devices may communicate using one or more networks. For example, the audio devices may communicate using a Wi-Fi network via connections to an access point 108. Continuing the example, FIG. 1 depicts a first communication link 110(1) between the master device 104 and an access point 108 and a second communication link 110(2) between a first slave device 106(1) and the access point 108. In other implementations, one or more of the audio devices may communicate using a Wi-Fi Direct protocol, a Bluetooth protocol, a Bluetooth Low Energy protocol, or other methods of wireless communication. In still other implementations, one or more audio devices may communicate with one or more other devices via wired connections.

To generate an audio output, the master device 104 may receive audio data 102 from a remote data source, such as one or more content servers 112, and may provide the audio data 102 to the slave devices 106. In other implementations, a first audio device may receive the audio data 102 from a data source and provide the audio data 102 to the master device 104, then the master device 104 may provide the audio data to the slave devices 106. While FIG. 1 depicts the remote data source as a content server 112, in other implementations, the source of the audio data 102 may include a local data source, such as a tablet, smartphone, or other computing device that communicates with the master device 104 via a Wi-Fi or Bluetooth connection. In some cases, a control device 114 may be used to provide a control command 116 to the master device 104, one or more of the slave devices 106, or both the master device 104 and the slave devices 106. In some implementations, the control device 114 may transmit the control command(s) 116 directly to one or more of the audio devices, such as through use of a Bluetooth protocol. In other implementations, the control device 114 may transmit a control command 116 to a particular audio device, such as the master device 104, which may in turn transmit the control command 116 to one or more other audio devices, such as slave devices 106. In still other implementations, the control device 114 may transmit a control command 116 to one or more of the audio devices via a communication link 110 with the access point(s) 108. In other implementations, the control device 114 may transmit a control command 116 to a remote computing device, such as the content server(s) 112, which may in turn provide one or more control commands 116 to one or more of the master device 104 or the slave devices 106. The control device 114 may include any type of computing device capable of transmitting a control command 116 including, without limitation, a smartphone, a tablet computer, a personal computer, a wearable computer, an automotive computer, a remote controller, and so forth. In other implementations, one or more of the audio devices, such as the master device 104, may function as the control device 114, and use of a separate control device 114 may be omitted. For example, the master device 104, one or more of the slave devices 106, or both, may be configured to receive audio commands or other types of input from a user, which may function as control commands 116, responsive to which one or more of the audio devices may perform additional functions.

Responsive to a control command 116, the master device 104 may provide a request 118(1) to the content server(s) 112 via the communication link 110(1) to the access point 108. Responsive to the request 118(1), the content server(s) 112 may provide the audio data 102 to the master device 104 via the communication link 110(1). The master device 104 may store the audio data 102 in a local cache or other data storage medium for subsequent use generating an audio output. The first slave device 106(1) may provide a request 118(2) to the master device 104, responsive to which the master device 104 may provide the audio data 102 to the first slave device 106(1) via the first communication link 110(1) between the master device 104 and the access point(s) 108 and the second communication link 110(2) between the access point(s) and the first slave device 106(1). In some implementations, the first slave device 106(1) may provide the request 118(2) to the master device 104 responsive to the control command 116. In other implementations, the master device 104 may provide the audio data 102 to the first slave device 106(1) in the absence of a request 118(2), responsive to the control command 116. In some implementations, the first slave device 106(1) may store the audio data 102 in a local cache or other data storage medium.

The master device 104 may also provide the audio data 102 to one or more other slave devices 106, such as the second slave device 106(2) and the third slave device 106(3) using a multicast transmission 120. For example, responsive to a control command 116, the second slave device 106(2) and third slave device 106(3) may each activate a multicast receiver. The master device 104 may then provide the audio data 102 to multiple slave devices 106 using a single multicast transmission 120. The slave devices 106 may receive the audio data 102 via the multicast transmission 120 and store the audio data 102 in a local cache or other data storage medium.

In some implementations, one or more slave devices 106 may provide a confirmation to the master device 104 or another computing device, such as the control device 114 or the content server(s) 112, indicating receipt of at least a portion of the audio data 102. If the confirmation indicates that one or more slave devices 106 have not received one or more portions of the audio data 102, the master device 104 may retransmit those portions of the audio data 102. In some implementations, the master device 104 may retransmit one or more portions of the audio data 102 to multiple slave devices 106 using a subsequent multicast transmission 120. Slave devices 106 that are lacking one or more portions of the audio data 102 may activate a multicast receiver to receive the audio data 102 via the multicast transmission 120, while other slave devices 106 that received the entirety of the audio data 102 may remain inactive. In other implementations, if a particular slave device 106 fails to receive all or a portion of the audio data 102 via a multicast transmission 120, the master device 104 may instead provide the audio data 102 to the particular slave device 106 via communication links 110 with the access point(s) 108. In some implementations, the receipt of confirmations from slave devices 106 may be used to control the rate at which the master device 104 provides the audio data 102. For example, the master device 104 may provide a first portion of the audio data 102 to multiple slave devices 106 using a multicast transmission 120, then remain inactive until a confirmation has been received from each slave device 106 expected to receive the audio data 102 or until a threshold length of time has lapsed. Subsequent to receipt of the confirmation(s) or the lapse of the threshold length of time, the master device 104 may provide a subsequent portion of the audio data 102 to the slave devices 106.

To generate an audio output, each audio device may retrieve at least a portion of the audio data 102 from the local cache or other data storage medium in which the audio data 102 was stored. In some implementations, one or more of the audio devices may instead generate an audio output using the audio data 102 as it is received from a remote source. For example, the master device 104 may generate the audio output as audio data 102 is received from the content server(s) 112, or the first slave device 106(1) may generate the audio output as audio data 102 is received from the master device 104. In some implementations, the audio output may be streamed as audio data 102 is received. For example, the master device 104 may simultaneously receive audio data 102 from the content server(s) 112 and provide the audio data 102 to the slave devices 106 via the communication links 110 and the multicast transmission 120. In some cases, the master device 104 may also retrieve the audio data 102 from a local cache and generate an audio output while providing or receiving audio data 102 to or from other devices. The slave devices 106 may simultaneously receive audio data 102 from the master device 104, retrieve audio data 102 from a local cache, and generate an audio output based on the audio data 102.

Figure 2:
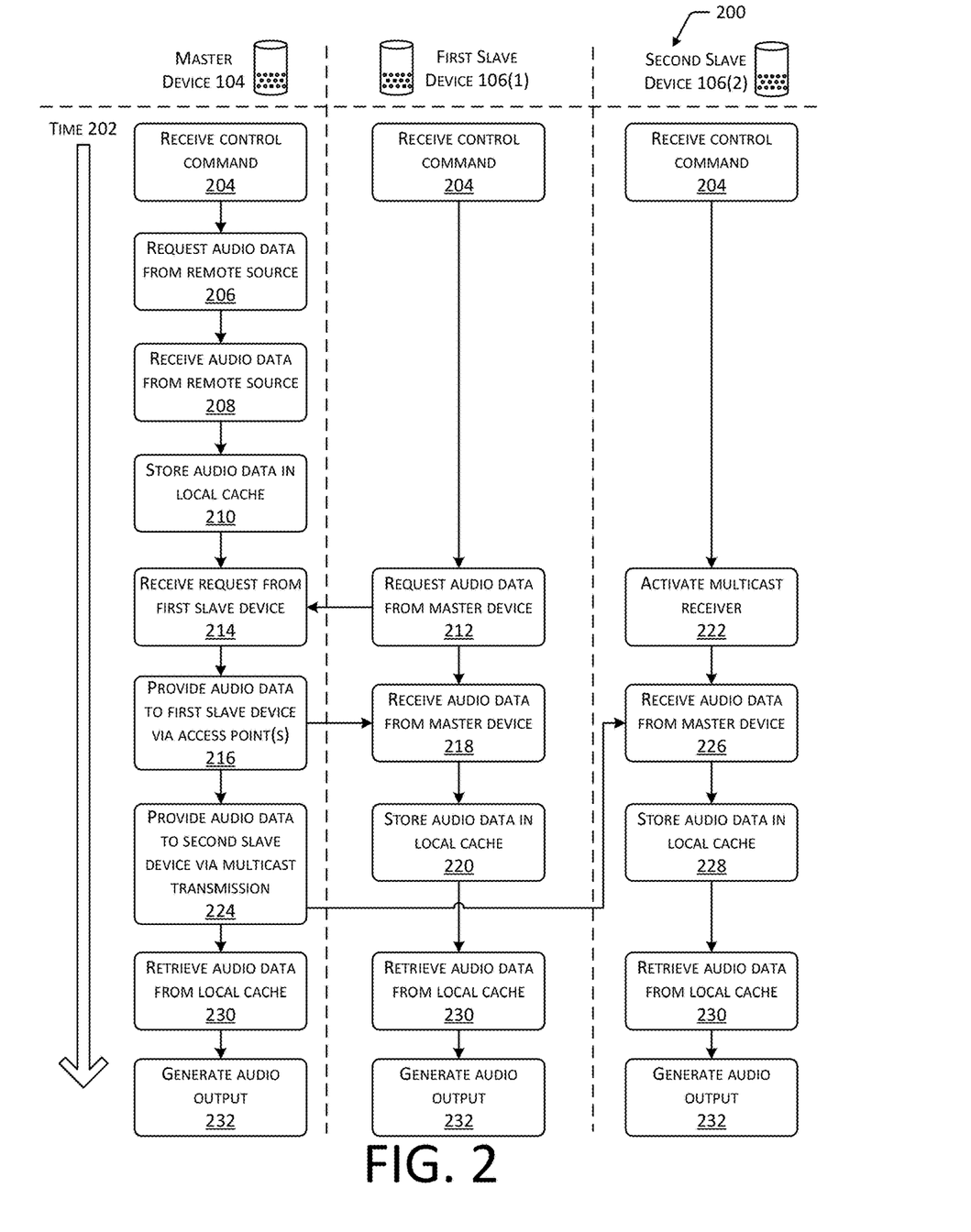
FIG. 2 is a flow diagram illustrating one possible implementation of interactions between audio devices to distribute audio data and generate an audio output.

FIG. 2 is a flow diagram 200 illustrating one possible implementation of interactions between audio devices to distribute audio data 102 and generate an audio output. The vertical arrow on the left side of the figure illustrates the passage of time 202. Specifically, FIG. 2 illustrates interactions between a master device 104, a first slave device 106(1), and a second slave device 106(2). While FIG. 2 illustrates a single master device 104, in other implementations, multiple master devices 104 may receive audio data 102 from a content server 112 or other remote data source and distribute the audio data 102 to respective groups of slave devices 106. Additionally, while FIG. 2 illustrates a single first slave device 106(1), the actions performed by the first slave device 106(1) may be performed by any number of slave devices 106 in communication with a master device 104 via communication links 110 with one or more access points 108. Further, while FIG. 2 illustrates a single second slave device 106(2), the actions performed by the second slave device 106(2) may be performed by any number of slave devices 106 configured to receive data from a master device 104 via a multicast transmission 120.

At block 204, the master device 104 may receive a control command 116. As described with regard to FIG. 1, a control device 114 may generate one or more control commands 116, which may be provided directly to the master device 104, or indirectly to the master device 104 via a communication link 110 to an access point 108. In other implementations, a control command 116 may be received, by the master device 104, from a remote computing device, such as a content server 112. In still other implementations, a control command 116 may be provided from a control device 114 or other computing device to a slave device 106, which may in turn provide the control command 116 to the master device 104, such as by using one or more communication links 110 with an access point 108. In some cases, a control device 114 may provide a control command 116 to a content server 112 or other remote computing device, and the content server 112 may provide one or more different control commands 116 to the master device 104 and slave devices 106. In other cases, a master device 104 or slave device 106 may function as a control device 114 and receive control commands 116 from a user. As such, block 204 may also include receipt of a control command 116 by one or more of the first slave device 106(1) and the second slave device 106(2). For example, a control command 116 provided from the control device 114 to the content server 112 may include a request to generate an audio output using particular audio devices and particular audio data 102. The content server 112 may provide a first control command 116 to the master device 104 that causes the master device 104 to request and receive the audio data 102 from the content server 112 and provide the audio data 102 to the slave devices 106. The content server 112 may provide a second control command 116 to the first slave device 106(1) to cause the first slave device 106(1) to request and receive the audio data 102 from the master device 104. The content server 112 may provide a third control command 116 to the second slave device 106(2) to cause the second slave device 106(2) to activate a multicast receiver to receive the audio data 102 from the master device 104.

At block 206, the master device 104 may request the audio data 102 from a remote source. For example, the master device 104 may provide a request 118 to one or more content servers 112 via a communication link 110 to an access point 108. The content of the request 118 may be determined at least in part based on the control command 116. For example, the request 118 may indicate the particular audio data 102 to be used to generate the audio output that is indicated in the control command 116. Responsive to the request 108, the content server 112 may provide the particular audio data 102 to the master device 104.

At block 208, the master device 104 may receive the audio data 102 from the remote source. At block 210, the master device 104 may store the audio data 102 in a local cache. The local cache may include RAM or another type of memory associated with the master device 104, one or more data storage media integrated with or in communication with the master device 104, and so forth. While FIG. 2 depicts the master device 104 storing the audio data 102 in a local cache prior to providing the audio data 102 to other devices, in other implementations, the master device 104 may store the audio data 102 in a local cache subsequent to or simultaneous with providing the audio data 102 to one or more other devices.

At block 212, the first slave device 106(1) may request the audio data 102 from the master device 104. For example, the first slave device 106(1) may generate a request 118 indicative of the audio data 102 responsive to the control command 116 and provide the request 118 to the master device 104 via communication links 110 with one or more access points 108. At block 214, the master device 104 may receive the request 118 from the first slave device 106(1). At block 216, the master device 104 may provide the audio data 102 to the first slave device 106(1) via the access point(s) 108. At block 218, the first slave device 106(1) may receive the audio data 102 from the master device 104. For example, as described with regard to FIG. 1, the master device 104 may provide the audio data 102 using a first communication link 110(1) between the master device 104 and an access point 108 and a second communication link 110(2) between the access point and the first slave device 106(1). While FIG. 1 depicts a single access point 108, in other implementations, the audio data 102 may be provided from a first access point 108 to a second access point 108, possibly traversing through one or more intermediate access points 108 or other devices. The first slave device 106(1) may be in communication with the second access point 108 and may receive the audio data 102 via a communication link 110 with the second access point 108.

In other implementations, the master device 104 may provide the audio data 102 to the first slave device 106(1) in the absence of a request 118 from the first slave device 106(1). For example, the control command 116 received by the master device 104 may indicate one or more slave devices 106 that are to receive the audio data 102. Responsive to the control command 116, the master device 104 may provide the audio data 102 to the indicated slave device(s) 106 independent of a request 118.

At block 220, subsequent to receiving the audio data 102 from the master device 104, the first slave device 106(1) may store the audio data 102 in a local cache. In other implementations, the first slave device 106(1) may generate an audio output using audio data 102 as it is received from the master device 104, and block 220 may be omitted.

At block 222, the second slave device 106(2) may activate a multicast receiver. For example, responsive to a control command 116 received from one or more of the master device 104, another slave device 106, a content server 112, or a control device 114, the second slave device 106(2) may initiate a multicast receiver to receive audio data 102 provided by the master device 104 using a multicast transmission 120. In the absence of a control command 116, the second slave device 106(2) or the multicast receiver thereof may remain inactive to conserve power or other resources. In other implementations, the multicast receiver of the second slave device 106(2) may remain continuously active, and block 222 may be omitted.

At block 224, the master device 104 may provide the audio data 102 to the second slave device 106(2) via a multicast transmission 120. At block 226, the second slave device 106(2) may receive the audio data 102 from the master device 104. As described previously, the master device 104 may use a single multicast transmission 120 to provide audio data 102 to multiple slave devices 106, which may conserve network bandwidth and other resources when compared to providing multiple individual copies of the audio data 102 to multiple slave devices 106 individually. Subsequent to receiving the audio data 102 from the master device 104, at block 228, the second slave device 106(2) may store the audio data 102 in a local cache. While FIG. 2 depicts the master device 104 providing audio data 102 to the first slave device 106(1) prior to providing audio data 102 to the second slave device 106(2), in other implementations, the master device 104 may first provide the audio data 102 to the second slave device 106(2). In still other implementations, the master device 104 may simultaneously provide the audio data 102 to the first slave device 106(1) and the second slave device 106(2).

In some implementations, one or more of the first slave device 106(1) or the second slave device 106(2) may provide a confirmation to the master device 104 or the content server(s) 112 indicating receipt or lack of receipt of at least a portion of the audio data 102. For example, a confirmation from a particular slave device 106 may indicate portions of the audio data 102 not received by the particular slave device 106. As another example, a confirmation from a particular slave device 106 may indicate portions of the audio data 102 that were received by the particular slave device 106. Responsive to one or more confirmations received from slave devices 106, the master device 104 or content server(s) 112 may determine the portions of the audio data 102 that were not received by particular slave devices 106, and the master device 104 may retransmit at least those portions of the audio data 102. In some implementations, portions of the audio data 102 may be retransmitted to multiple slave devices 106 using a single multicast transmission 120. In other implementations, if a particular slave device 106 fails to receive at least a portion of the audio data 102 via a multicast transmission 120, the master device 104 may instead retransmit the audio data 102 to the particular slave device 106 via communication links 110 to one or more access points 108. In some implementations, the confirmations received from slave devices 106 may at least partially determine the rate at which the master device 104 provides audio data 102 to the slave devices 106. For example, a master device 104 may provide a first portion of audio data 102 to multiple slave devices 106 via a multicast transmission 120, then refrain from providing a second portion of the audio data 102 until confirmations have been received from each slave device 106 expected to receive the multicast transmission 120.

Block 230 retrieves audio data 102 from the local cache of each respective audio device. Block 232 generates an audio output based on the audio data 102. As described previously, in some implementations, one or more of the master device 104, the first slave device 106(1), or the second slave device 106(2) may store audio data 102 in a local cache or other data storage medium. Use of a local cache to store audio data 102 received from the master device 104 may enable an audio application that generates an audio output by requesting and receiving audio data 102 to function by executing the same commands normally used to retrieve audio data 102. For example, an audio application, executing on a slave device 106, that typically requests audio data 102 from a content server 112 using a HTTP get command may execute the same HTTP get command at the same time that it would normally be executed. However, the command may specify the network address of the local cache associated with the slave device 106 rather than the network address of the content server 112. In other implementations, one or more of the audio devices may generate an output as audio data 102 is received, without using a local cache. For example, the second slave device 106(2) and other slave devices 106 that receive the audio data 102 from the master device 104 via a multicast transmission 120 may store the audio data 102 in a local cache, while the first slave device 106(1) and other slave devices 106 that receive the audio data 102 using a connection to an access point 108 may generate the audio output using audio data 102 received from the master device 104. The audio application may be configured to generate a synchronized audio output using multiple audio devices, such as by controlling the times at which particular devices process the audio data 102, the times at which particular devices emit sounds, one or more characteristics of the emitted sounds, such as the volume, and so forth.

While FIG. 2 depicts an implementation for generating an audio output using one or more audio devices, in other implementations, other types of devices may be used to generate other types of output using other types of data. For example, a master device 104 and one or more slave devices 106 may receive, distribute, and process video data for generating a video output.

Figure 3:
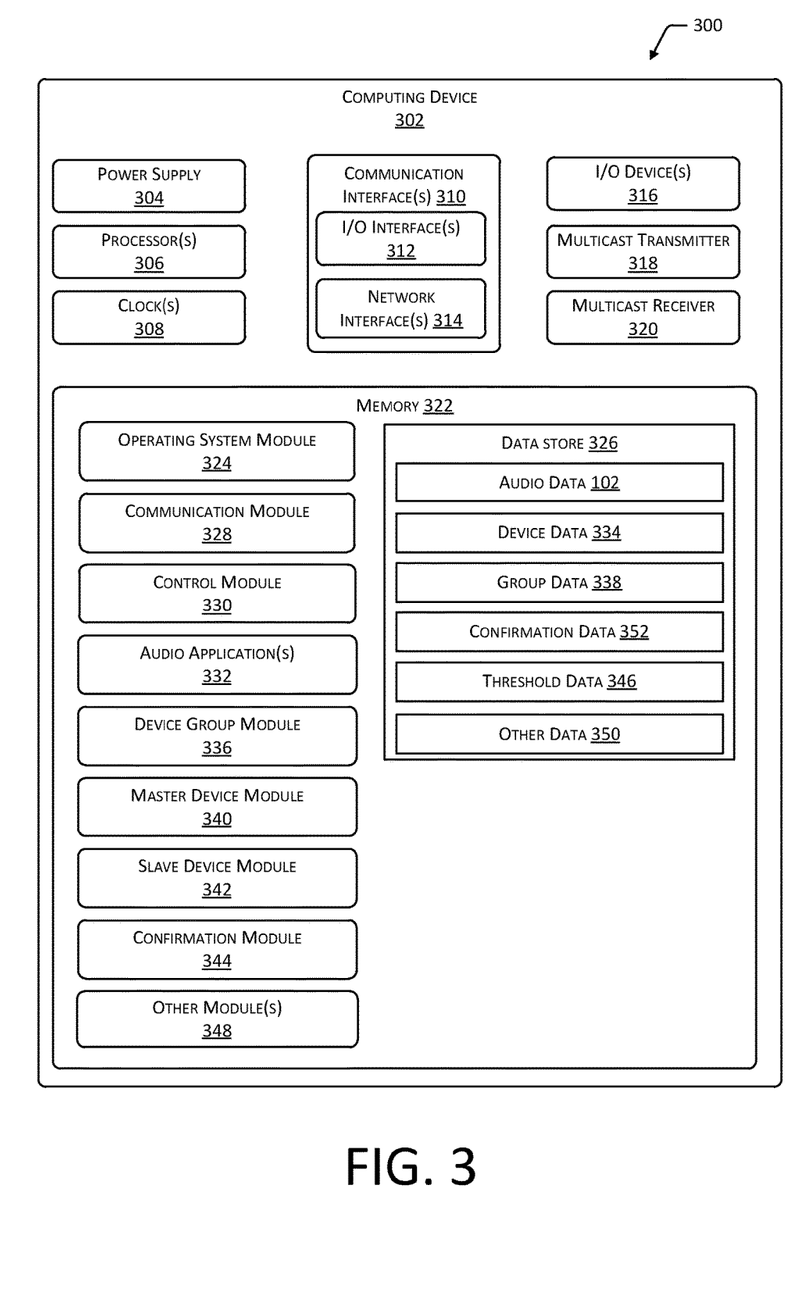
FIG. 3 is a block diagram depicting one implementation of a computing device within the scope of the present disclosure.

FIG. 3 is a block diagram 300 depicting one implementation of a computing device 302 within the scope of the present disclosure. The computing device 302 may include, without limitation, any of the devices depicted in FIG. 1, such as a master device 104 or a slave device 106, or any other computing device 302 in communication with the master device 104 or the slave device 106, such as a content server 112 or a control device 114. Additionally, while FIG. 3 depicts a single example computing device 302, multiple computing devices 302 may be used to perform the functions described herein.

The computing device 302 may include one or more power supplies 304 configured to provide electrical power suitable for operating the components of the computing device 302. In some implementations, the power supply 304 may include a rechargeable battery, fuel cell, photovoltaic cell, power conditioning circuitry, and so forth.

The computing device 302 may include one or more hardware processor(s) 306 (processors) configured to execute one or more stored instructions. The processor(s) 306 may include one or more cores. One or more clocks 308 may provide information indicative of date, time, ticks, and so forth. For example, the processor(s) 306 may use data from the clock 308 to generate a timestamp, trigger a preprogrammed action, and so forth. Continuing the example, data from a clock 308 may be used to synchronize the output of multiple audio devices, to determine the lapse of a threshold length of time without receiving a confirmation indicating receipt of audio data 102 from a receiving device, and so forth.

The computing device 302 may include one or more communication interfaces 310, such as input/output (I/O) interfaces 312, network interfaces 314, and so forth. The communication interfaces 310 may enable the computing device 302, or components of the computing device 302, to communicate with other computing devices 302 or components thereof. The I/O interfaces 312 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 312 may couple to one or more I/O devices 316. The I/O devices 316 may include any manner of input device or output device associated with the computing device 302 or with another computing device 302 in communication therewith. For example, I/O devices 316 may include touch sensors, keyboards, mouse devices, microphones, image sensors (e.g., cameras), scanners, displays, speakers, haptic devices, printers, motion sensors, location sensors, and so forth. In some implementations, the I/O devices 316 may be physically incorporated with a computing device 302 or may be externally placed.

The network interfaces 314 may be configured to provide communications between the computing device 302 and other devices, such as the I/O devices 316, routers, access points 108, and so forth. The network interfaces 314 may include devices configured to couple to one or more networks including local area networks (LANs), wireless LANs (WLANs), wide area networks (WANs), wireless WANs (WWANs), and so forth. For example, the network interfaces 314 may include computing devices 302 compatible with Ethernet, Wi-Fi, Wi-Fi Direct, Bluetooth, Bluetooth Low Energy, ZigBee, Z-Wave, 3G, 4G, LTE, and so forth.

The computing device 302 may also include a multicast transmitter 318 that may be used to communicate data to other computing devices 302 using one or more multicast transmissions 120. The computing device 302 may further include a multicast receiver 320, which may receive data from other computing devices 302 that were provided data using a multicast transmission 120.

The computing device 302 may include one or more busses or other internal communications hardware or software that allows for the transfer of data between the various modules and components of the computing device 302.

As shown in FIG. 3, the computing device 302 may include one or more memories 322. The memory 322 may include one or more computer-readable storage media (CRSM). The CRSM may be any one or more of an electronic storage medium, a magnetic storage medium, an optical storage medium, a quantum storage medium, a mechanical computer storage medium, and so forth. The memory 322 may provide storage of computer-readable instructions, data structures, program modules, audio data 102, and other data for the operation of the computing device 302. A few example modules are shown stored in the memory 322, although the same functionality may alternatively be implemented in hardware, firmware, or as a system on a chip (SoC).

The memory 322 may include one or more operating system (OS) modules 324. The OS module 324 may be configured to manage hardware resource devices such as the I/O interfaces 312, the network interfaces 314, the I/O devices 316, and to provide various services to applications or modules executing on the processors 306. The OS module 324 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 326 and one or more of the following modules may also be stored in the memory 322. The modules may be executed as foreground applications, background tasks, daemons, and so forth. The data store 326 may use a flat file, database, linked list, tree, executable code, script, or other data structure to store information. In some implementations, the data store 326 or a portion of the data store 326 may be distributed across one or more other devices including other computing devices 302, network attached storage devices, and so forth.

A communication module 328 stored in the memory 322 may be configured to establish communications with audio devices, servers, control devices 114, or other computing devices 302.

The memory 322 may also store a control module 330. The control module 330 may be used to generate control commands 116 that may be used to control the computing device 302 and other computing devices 302 in communication therewith. For example, a control command 116 may be used to indicate particular audio data 102 to be used to generate an audio output, one or more audio applications 332 that may be used to generate the audio output based on the audio data 102, one or more audio devices to be used to generate the audio output, and so forth. In some implementations, the control module 330 may be configured to present a user interface and receive user input indicative of particular audio data 102, audio devices, audio applications 332, and so forth.

The audio application(s) 332 stored in the memory 322 may be used to generate audio output based on audio data 102. For example, an audio application 332 may cause an output device, such as a speaker, to emit sound based on audio data 102. In some implementations, the audio application(s) 332 may be configured to generate a synchronized audio output using multiple audio devices. For example, the audio application(s) 332 may control the times at which sounds are emitted, the volumes, frequencies, and other characteristics of the emitted sounds, and so forth, to cause multiple audio devices to produce a synchronized output. Continuing the example, controlling the times at which various output devices emit sound may be used to enable multiple devices to produce complementary output at the same time. Controlling the volume of the sound emitted by output devices may enable devices to produce sounds having a desired perceived volume at a listening position, based on the position of the audio devices. Controlling the particular frequencies or other types of sound output using an audio device may enable different devices to provide different complementary aspects of a synchronized audio output, such as different channels of a surround-sound output. In some implementations, the audio application(s) 332 may access device data 334 that may indicate particular characteristics, capabilities, or locations of one or more audio devices. For example, the device data 334 may indicate the distance between a particular audio device and a listening position, the range of frequencies or volumes that may be emitted by the audio device, and so forth.

The memory 322 may additionally store a device group module 336. The device group module 336 may determine one or more groups of audio devices that may be used to provide an audio output. For example, based on device data 334 indicative of the characteristics of one or more audio devices, the device group module 336 may determine whether generation of an audio output based on particular audio data 102, using a particular audio application 332 and a particular set of audio devices is possible. The determination may be based on the characteristics of the audio devices and the network(s) by which the audio devices communicate. The device group module 336 may also determine which of the audio devices function as the master device 104, which of the audio devices function as slave devices 106, which of the slave devices 106 receive audio data 102 via the access point(s) 108, and which of the slave devices receive audio data 102 via a multicast transmission 120. An indication of usable groups of audio devices determined by the device group module 336 may be stored as group data 338. Example methods for determining groups of audio devices are described in U.S. patent application Ser. Nos. 15/245,897 and 15/246,070, incorporated by reference above. In some implementations, the device group module 336 may determine a group of audio devices responsive to receipt of a control command 116. In other implementations, the device group module 336 may access existing group data 338 and determine a group of audio devices prior to or subsequent to receipt of a control command 116.

The memory 322 may additionally store a master device module 340. The master device module 340 may be used if the group data 338 determined by the device group module 336 indicates that the computing device 302 is to function as a master device 104 within a group of audio devices. The master device module 340 may generate a request 118 based on a received control command 116, the request 118 indicating particular audio data 102 to be used to generate an audio output. The request 118 may be provided to a content server 112 or other computing device 302, which may provide the audio data 102 responsive to the request 118. The master device module 340 may receive the audio data 102 and store the audio data 102 in the memory 322. The master device module 340 may then provide the audio data 102 to one or more slave devices 106, indicated in the group data 338. For example, the group data 338 may indicate that a first slave device 106(1) is to receive the audio data 102 via a communication link 110 with an access point 108 and one or more other slave devices 106 are to receive the audio data 102 via a multicast transmission 120. Based on the group data 338, the master device module 340 may provide the audio data 102 to the first slave device 106(1) via one or more communication links 110 to one or more access points 108, and generate a multicast transmission 120 to provide the audio data 102 to one or more other audio devices. To generate the audio output using the distributed audio data 102, the audio application(s) 332 may retrieve the stored audio data 102 from the memory 322. The master device module 340 may also be configured to receive confirmations from slave devices 106 and provide additional audio data 102 responsive to the received confirmations.

The memory 322 may store a slave device module 342, which may be used if the group data 338 determined by the device group module 336 indicates that the computing device 302 is to function as a slave device 106 within a group of audio devices. If the group data 338 indicates that the computing device 302 is to receive the audio data 102 via one or more communication links 110 to one or more access points 108, the slave device module 342 may provide a request 118 for the audio data 102 via the communication link(s) 110 to the master device 104. The slave device module 342 may receive the audio data 102 from the master device 104. If the group data 338 indicates that the computing device 302 is to receive the audio data 102 via a multicast transmission 120, the slave device module 342 may activate the multicast receiver 320 and receive the multicast transmission 120 from the master device 104. The received audio data 102 may be stored in the memory 322. To generate the audio output using the distributed audio data 102, the audio application(s) 332 may retrieve the stored audio data 102 from the memory 322.

In some implementations, the slave device module 342 may also be used to provide a confirmation to a master device 104 after receiving audio data 102 therefrom. For example, the slave device module 342 may determine correspondence between the audio data 102 received from a master device 104 or another data source, such as a content server 112, and the audio data 102 that was expected to be received to determine any portions of the audio data 102 that were not successfully received. The slave device module 342 may then provide confirmation data 352 to the master device 104 or other computing device 302 indicating the portions of the audio data 102 that were not received. In other implementations, the slave device module 342 may provide confirmation data 352 to the master device 104 or other computing device 302 indicative of the portions of the audio data 102 that were received. The master device 104 or another computing device 302 may then determine correspondence between the confirmation data 352 and the audio data 102 to determine portions of the audio data 102 that were not successfully received. In still other implementations, the confirmation data 352 may be used to verify that one or more receiving computing devices 302 have received audio data 102 before performing a subsequent action. For example, the audio devices may delay generation of an audio output until a confirmation has been received from multiple slave devices 106. As another example, a master device 104 may delay providing of a second portion of audio data 102 via a multicast transmission 120 until a confirmation has been received from multiple slave devices 106 indicating receipt of a first portion of the audio data 102. In some implementations, if no confirmation is received within a threshold length of time, indicated by threshold data 346, a subsequent action may be taken in the absence of a confirmation. For example, subsequent actions may include generation of an audio output without using a particular audio device from which a confirmation was not received, audio data 102 may be retransmitted to the particular audio device, an error message may be generated, and so forth.

Other modules 348 may also be present in the memory 322. For example, encryption modules may be used to encrypt and decrypt communications between computing devices 302. The other modules 348 may also include modules for receiving user input to configure parameters of audio devices, set threshold values of the threshold data 346, and so forth. Other modules 348 may further include location modules that may be used to determine the location of particular audio devices relative to other audio devices or access points 108. In some implementations, the locations of audio devices or other devices may be determined based on device data 334. In other implementations, the locations of devices may be determined using a radio navigation-based system, such as a Global Positioning System (GPS) receiver, or other terrestrial or satellite-based navigational systems. In still other implementations, the locations of devices may be determined using one or more device sensors or other I/O devices 316.

Other data 350 within the data store 326 may include user input data, such as configurations and settings associated with computing devices 302. Other data 350 may also include security data, such as encryption keys and schema, access credentials, and so forth. Other data 350 may additionally include rules, algorithms, and so forth, used by the audio application(s) 332 to synchronize and control audio output, such as by determining time delays between the emissions of sounds based on the locations of audio devices.

In different implementations, different computing devices 302 may have different capabilities or capacities. For example, content servers 112 may have significantly more processor 306 capability and memory 322 capacity compared to the processor 306 capability and memory 322 capacity of audio devices.

Figure 4:
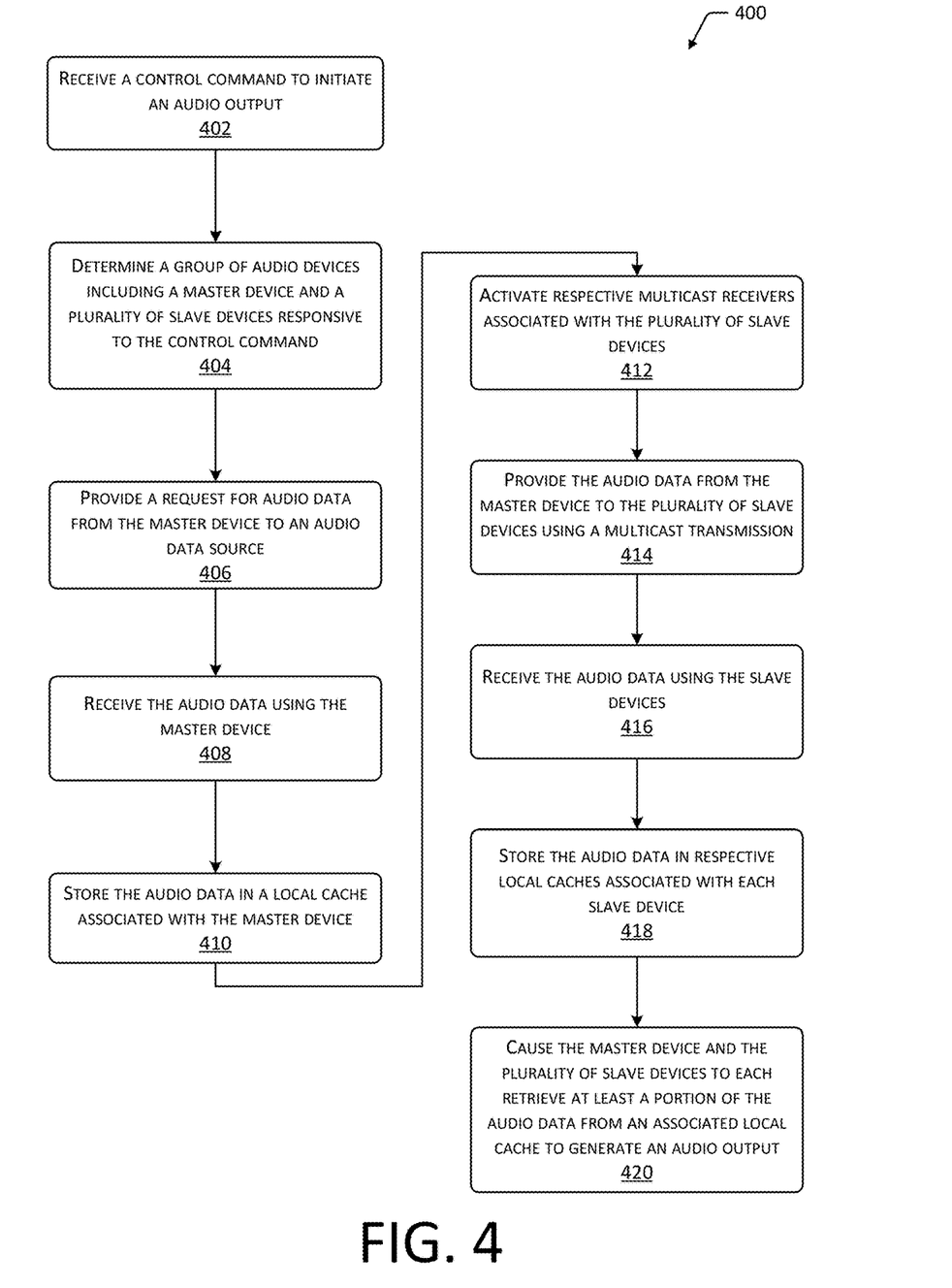
FIG. 4 is a flow diagram illustrating a method for distributing audio data to a group of audio devices for generation of an audio output.

FIG. 4 is a flow diagram 400 illustrating a method for distributing audio data 102 to a group of audio devices for generation of an audio output. Block 402 receives a control command 116 to initiate an audio output. A control command 116 may be received by one or more audio devices. For example, a control device 114 may provide a control command 116 to a first audio device, which may in turn provide one or more control commands 116 to other audio devices. As another example, a control device 114 may provide a control command 116 to a remote computing device 302, such as a content server 112, which may in turn provide one or more control commands 116 to one or more audio devices. In some cases, a control device 114 may provide control commands 116 to audio devices, content servers 112, or other computing devices 302 via one or more communication links 110 with one or more access points 108.

Block 404 determines a group of audio devices including a master device 104 and a plurality of slave devices 106 responsive to the control command 116. For example, as described with regard to FIG. 3, a device group module 336 may configure a particular audio device to function as the master device 104 and other audio devices to function as slave devices 106 based on device data 334. In some implementations, a group of audio devices may be determined based on existing group data 338. In still other implementations, the group of audio devices may be determined based on the control command 116.

In one implementation, a user associated with a control device 114 may access an audio application 332, which may present a user interface, such as a list of songs or other indication of audio data 102 from which an audio output may be generated. In some implementations, the user interface may also be used to select particular audio devices to be used to generate the audio output. The user input may be used to generate a control command 116, which may be provided to a content server 112 or other computing device 302 via one or more networks. The content server 112 may, in turn, provide a control command 116 to the master device 104 indicative of the location of the audio data 102.

Block 406 provides a request 118 for audio data 102 from the master device 104 to an audio data source, such as the content server 112. For example, based on the control command 116, the request 118 may be directed to a particular location, such as a HTTP get command addressed to the location of the audio data 102. Responsive to the request 118, the content server 112 or other data source may provide the audio data 102 to the master device 104, such as via one or more communication links 110 from the master device 104 to an access point 108. Block 408 receives the audio data 102 using the master device 104.

Block 410 stores the audio data 102 in a local cache associated with the master device 104. At a subsequent time, the audio data 102 stored in the local cache may be retrieved and used to generate an audio output in a manner determined by the audio application 332. For example, the audio application 332 may control the timing, volume, or other characteristics of the audio output associated with the master device 104 or the processing of the audio data 102 by the master device 104.

In some cases, one or more slave devices 106 may be configured for communication with the master device 104 via communication links 110 to an access point 108, rather than a multicast transmission 120. In such cases, these slave devices 106 may receive a control command 116 from one or more of a control device 114, the content server 112, or the master device 104, indicative of an address of the master device 104. Responsive to the control command 116, the slave device(s) 106 may provide respective requests 118 to the master device 104, such as HTTP get commands indicating the address of the master device 104, to receive the audio data 102. The master device 104 may provide the audio data 102 to respective slave devices 106 responsive to these requests 118 via communication links 110 between the master device 104 and the access point 108 and between the access point 108 and the receiving slave devices 106.

Block 412 activates respective multicast receivers 320 associated with the plurality of slave devices 106. For example, one or more of the slave devices 106 may receive a control command 116 from the master device 104, the content server 112, the control device 114, or another slave device 106, and the receiving slave device(s) 106 may activate a multicast receiver 320 responsive to the control command 116.

Block 414 provides the audio data 102 from the master device 104 to the plurality of slave devices 106 using a multicast transmission 120. In one implementation, the master device 104 may execute a daemon, virtual server, or other computing structure that retrieves the audio data 102 from the local cache associated with the master device 104, such as by using a HTTP get command. The audio data 102 may be stored in a local cache managed by the daemon, from which the audio data 102 may be distributed in a stream via one or more multicast transmissions 120. Block 416 receives the audio data 102 using the slave devices 106. For example, each slave device 106 may be configured to receive multicast transmissions 120 having a certain multicast address. Block 418 stores the audio data 102 in local caches associated with each slave device 106.

Block 420 causes the master device 104 and the plurality of slave devices 106 to each retrieve at least a portion of the audio data 102 from an associated local cache to generate an audio output. For example, each audio device may use a HTTP get command that indicates the address of the respective local cache associated with the audio device to retrieve the audio data 102. In some implementations, the audio output may be generated simultaneously with the receipt of additional audio data 102, such as by streaming audio data 102 from the master device 104 to each slave device 106 via a multicast transmission 120. The slave devices 106 may store additional audio data 102 in an associated local cache while generating an audio output using audio data 102 currently stored in the cache.

Figure 5:
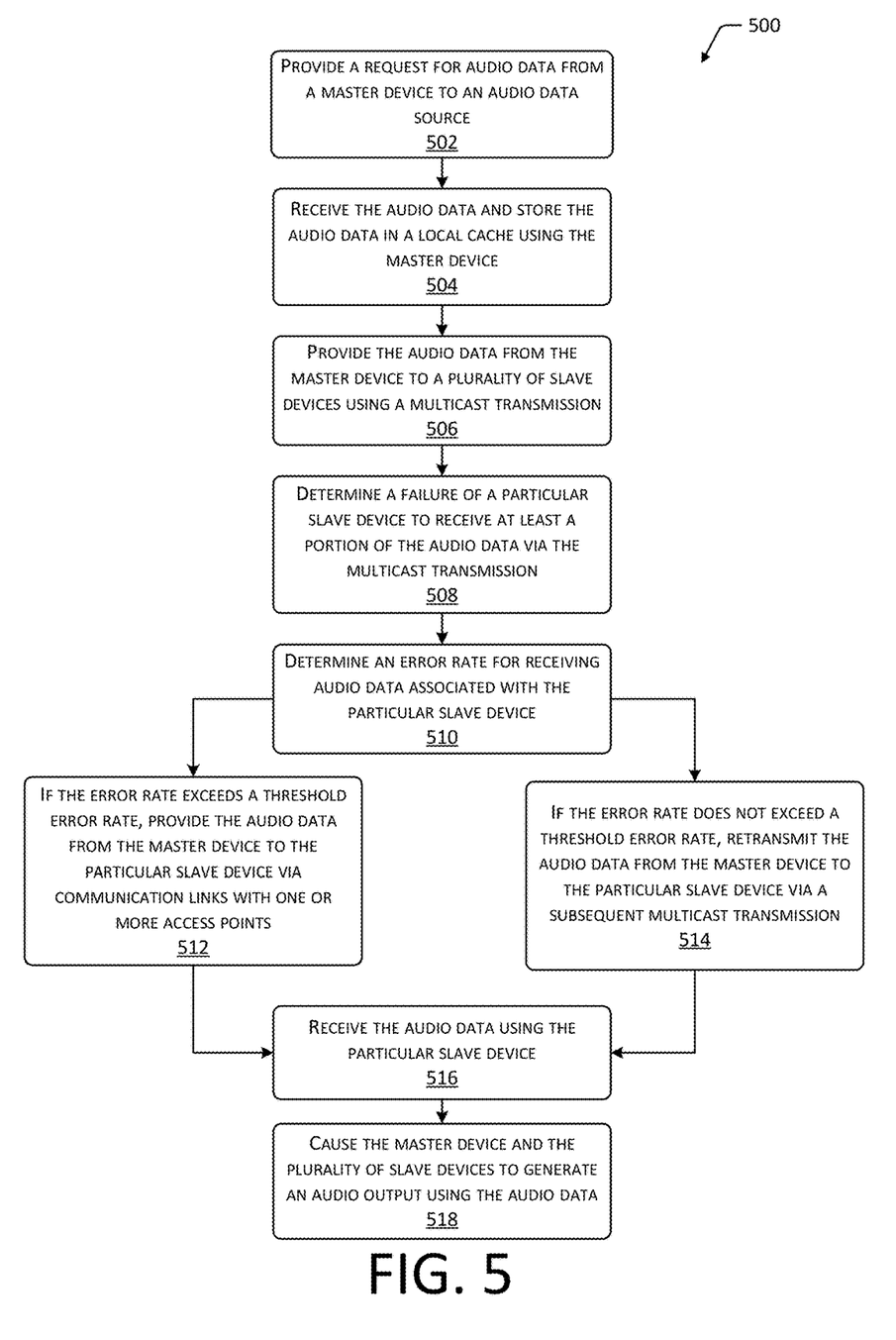
FIG. 5 is a flow diagram illustrating a method for distributing audio data to particular audio devices that fail to receive the audio data via a multicast transmission.

FIG. 5 is a flow diagram 500 illustrating a method for distributing audio data 102 to particular audio devices that fail to receive the audio data 102 via a multicast transmission 120. Block 502 provides a request 118 for audio data 102 from a master device 104 to an audio data source, such as one or more content servers 112. The request 118 may indicate particular audio data 102. In some implementations, the request 118 may be based on a control command 116 received by the master device 104, such as a control command 116 indicating particular audio data 102, particular audio devices, particular audio applications 332, or a particular location of the audio data 102. For example, the request 118 may include a command to retrieve the audio data 102 from a location determined from the control command 116. Block 504 receives the audio data 102 and stores the audio data 102 in a local cache using the master device 104.

Block 506 provides the audio data 102 from the master device 104 to a plurality of slave devices 106 using a multicast transmission 120. As described with regard to FIG. 4, in some implementations, the multicast transmission 120 may be performed using a daemon or other construct and a local cache or server associated with the multicast transmission 120. Each slave device 106 of the plurality of slave devices 106 may activate a multicast receiver 320 to receive the multicast transmission 120.

Block 508 may determine a failure of a particular slave device 106 to receive at least a portion of the audio data 102 via the multicast transmission 120. For example, as described with regard to FIG. 3, a confirmation module 344 may determine, based on confirmation data 352 provided by the particular slave device 106, that at least a portion of the audio data 102 was not successfully received by the particular slave device 106. In other implementations, the particular slave device 106 may provide one or more other notifications indicative of a failure or inability to receive the multicast transmission 120. For example, the multicast receiver 320 of the particular slave device 106 may become damaged or otherwise non-functional. As another example, the particular slave device 106 or the master device 104 may be moved to a different position, such that the particular slave device 106 is no longer within range of the multicast transmission 120. As yet another example, conditions associated with the network(s) used by the audio devices or the environment associated with the audio devices, such as noise or the placement of physical objects, may hinder receipt of the audio data 102 by the particular slave device 106.

Block 510 may determine an error rate for receiving audio data 102 associated with the particular slave device 106. The error rate may include an indication of audio data 102 that was successfully received by the particular slave device 106, an indication of audio data 102 that was not successfully received by the particular slave device 106, or both indications of successful and unsuccessful receipt of the audio data 102. If the error rate exceeds a threshold error rate, this may indicate that conditions associated with the network or environment used by the particular slave device 106 may prevent successful use of a multicast transmission 120 to provide audio data 102 to the particular slave device 106.

If the error rate exceeds a threshold error rate, block 512 provides the audio data 102 from the master device 104 to the particular slave device 106 via the communication links 110 with the one or more access points 108. If the error rate does not exceed the threshold error rate, block 514 retransmits the audio data 102 from the master device 104 to the particular slave device 106 via a subsequent multicast transmission 120. In cases where portions of the audio data 102 were not received by multiple slave devices 106, the master device 104 may transmit the audio data 102 to multiple slave devices 106 using a single multicast transmission 120.

Block 516 receives the audio data 102 using the particular slave device 106. Block 518 causes the master device 104 and the plurality of slave devices 106 to generate an audio output using the audio data 102. For example, to generate the audio output, each audio device may retrieve at least a portion of the audio data 102 from a local cache or other data storage medium. One or more audio applications 332 may be used to control the timing or other characteristics of the particular sounds emitted by each audio device, the processing of the audio data 102 by one or more of the audio devices, and so forth.

Figure 6:
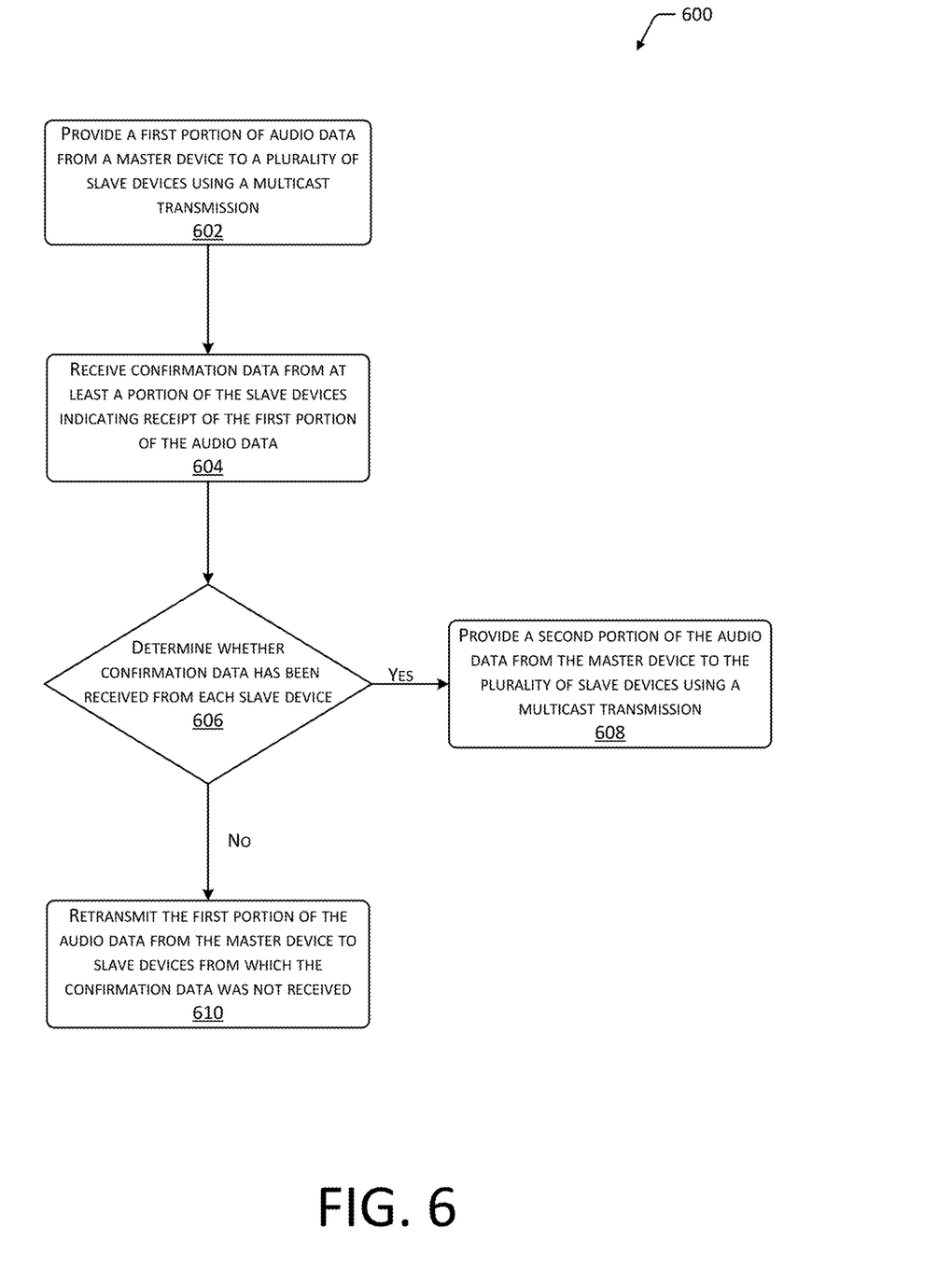
FIG. 6 is a flow diagram illustrating a method for determining a rate at which portions of audio data are provided to audio devices based on confirmation data received from the audio devices.

FIG. 6 is a flow diagram 600 illustrating a method for determining a rate at which portions of audio data 102 are provided to audio devices based on confirmation data 352 received from the audio devices. Block 602 provides a first portion of audio data 102 from a master device 104 to a plurality of slave devices 106 using a multicast transmission 120. Different slave devices 106 may receive the audio data 102 at different times or process the audio data 102 at different rates based on the relative locations of the slave devices 106 and the master device 104, network characteristics such as noise, characteristics of the audio devices, and so forth.

Block 604 receives confirmation data 352 from at least a portion of the slave devices 106 indicating receipt of the first portion of the audio data 102. The confirmation data 352 may indicate receipt of the audio data 102, a lack of receipt of the audio data 102, an indication of portions of the audio data 102 that were received, an indication of portions of the audio data 102 that were not received, and so forth. Based on the confirmation data 352, the master device 104 or another computing device 302 in communication therewith may determine whether confirmation data 352 was received from each slave device 106 and whether the confirmation data 352 indicates successful receipt of the first portion of the audio data by each slave device 106. Block 606 determines whether the confirmation data 352 has been received from each slave device 106.

If confirmation data 352 indicating successful receipt of the first portion of the audio data 102 has been received from each slave device 106, block 608 may provide a second portion of the audio data 102 from the master device 104 to the plurality of slave devices 106 using a multicast transmission 120. If confirmation data 352 indicating successful receipt of the first portion of the audio data 102 has not been received from each slave device 106, block 610 may retransmit the first portion of the audio data 102 from the master device 104 to the slave devices 106 from which the confirmation data 352 was not received. In some implementations, the first portion of the audio data 102 may be retransmitted using a multicast transmission 120. In other implementations, the first portion of the audio data 102 may be provided to respective slave devices 106 from which confirmation data 352 was not received using communication links 110 to one or more access points 108. In some implementations, block 610 may include retransmitting the entire first portion of the audio data 102. In other implementations, parts of the first portion of the audio data 102 that were not received, which may be determine based on the confirmation data 352, may be provided to the slave device(s) 106.

In some implementations, if a threshold length of time has lapsed and confirmation data 352 has not been received from each slave device 106, the audio output may be generated without using the particular slave devices 106 from which confirmation data 352 was not received. In other implementations, a notification indicating a failure to generate the audio output may be provided to a user associated with the control device 114. In some cases, the notification may indicate the particular slave devices 106 from which no confirmation data 352 was received. In still other implementations, if a threshold length of time has lapsed and confirmation data 352 has not been received from each slave device 106, the audio data 102 may be provided to the respective slave devices 106 from which confirmation data 352 was not received using other methods, such as a communication using a Wi-Fi, Wi-Fi Direct, or Bluetooth network.

In other implementations, the master device 104 may transmit multiple portions of the audio data 102 to a plurality of slave devices 106 using a single multicast transmission 120. The confirmation data 352 received from the slave devices 106 may indicate the portions of the audio data 102 that were successfully received, or portions of the audio data 102 that were not successfully received. Responsive to the confirmation data 352, the master device 104 may then use a subsequent single multicast transmission 120 to transmit each of the portions of the audio data 102 that were not received by one or more of the slave devices 106.

In still other implementations, the master device may transmit a first portion of the audio data 102 to a plurality of slave devices 106 using a single multicast transmission 120. Confirmation data 352 received from the slave devices 106 may be used to indicate parts of the first portion that were not received by one or more of the slave devices 106. The master device 104 may then transmit a subsequent multicast transmission 120 that includes both a second portion of the audio data 102 and parts of the first portion of the audio data 102 that were not received by particular slave devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising a master audio device and a plurality of first slave audio devices,
    the master audio device including:
        one or more first memories storing computer-executable instructions; and
        one or more first hardware processors to execute the computer-executable instructions to:
            receive a command to initiate an audio output using the master audio device and the plurality of first slave audio devices;
            provide a request for audio data associated with the audio output;
            receive the audio data;
            store the audio data in a first local cache associated with the master audio device;
            provide a first portion of the audio data to the plurality of first slave audio devices using a multicast transmission;
            receive a confirmation of receipt from at least a first slave audio device and a second slave audio device of the plurality of first slave audio devices;
            in response to receiving the confirmation of receipt, provide a second portion of the audio data to the plurality of first slave audio devices;
            retrieve a portion of the audio data from the first local cache; and
            output audio corresponding to the portion of the audio data; and
    each respective slave audio device of the plurality of first slave audio devices including:
        one or more second memories storing computer-executable instructions; and
        one or more second hardware processors to execute the computer-executable instructions to:
            receive a signal from one or more of the master audio device or a control device in communication with the master audio device and activate a multicast receiver;
            receive, using the multicast receiver, the audio data from the master audio device;
            store the audio data received from the master audio device in a second local cache associated with the respective slave audio device;
            retrieve the portion of the audio data from the second local cache; and
            output audio corresponding to the portion of the audio data.

2. The system of claim 1, further including an access point communicably connected to the master audio device and a third slave audio device, wherein the master audio device further comprises computer-executable instructions to:
    receive, via the access point, a request for the audio data from the third slave audio device;
    provide the audio data to the third slave audio device via the access point; and
    wherein the third slave audio device includes one or more third memories storing computer-executable instructions and one or more third hardware processors to execute the computer-executable instructions to:
        provide the request to the master audio device;
        receive, via the access point, the audio data from the master audio device; and output audio corresponding to the portion of the audio data.

3. The system of claim 1, including an access point communicably coupled to the master audio device and at least one slave audio device of the plurality of first slave audio devices, wherein the computer-executable instructions of the master audio device are to:
 determine that one or more portions of the audio data were not received by the at least one slave audio device;
 determine that an error rate associated with receipt of data by the at least one slave audio device exceeds a threshold error rate; and
 provide the one or more portions of the audio data to the at least one slave audio device via the access point.

4. The system of claim 1, wherein at least one slave audio device of the plurality of first slave audio devices further comprises computer-executable instructions to:
 determine that one or more portions of the audio data were not received via the multicast transmission;
 provide an indication of the one or more portions of the audio data to the master audio device;
 receive, using the multicast receiver, the one or more portions of the audio data from the master audio device; and
 wherein the master audio device further comprises computer-executable instructions to:
  receive a first indication of the one or more portions of the audio data from the first slave audio device of the plurality of first slave audio devices;
  receive a second indication of the one or more portions of the audio data from the second slave audio device of the plurality of first slave audio devices; and
  provide the one or more portions of the audio data to the first slave audio device and the second slave audio device using a single multicast transmission.

5. A method comprising:
 receiving, by a first audio device, a command to output audio, wherein the command is indicative of one or more of audio data or one or more audio devices;
 generating, by the first audio device, a request for the audio data based on the command;
 receiving, by the first audio device, the audio data;
 storing, by the first audio device, the audio data in a first cache associated with the first audio device;
 providing, by the first audio device, the audio data to a second audio device and a third audio device using a multicast transmission;
 receiving, by the first audio device from the second audio device, a first indication of one or more portions of the audio data that were not received;
 receiving, by the first audio device from the third audio device, a second indication of the one or more portions of the audio data not received; and
 providing, by the first audio device, the one or more portions of the audio data to the second audio device and the third audio device using a single multicast transmission;
 storing, by the second audio device, the audio data in a second cache;
 configuring a first audio application associated with the first audio device to retrieve the audio data from the first cache;
 causing the first audio device to retrieve at least a portion of the audio data from the first cache and to output audio corresponding to the at least a portion of the audio data; and
 causing the second audio device to retrieve the at least a portion of the audio data from the second cache and to output audio corresponding to the at least a portion of the audio data.

6. The method of claim 5, further comprising:
 providing, by the first audio device, the audio data to a fourth audio via an access point in communication with the first audio device and the fourth audio device; and
 causing the fourth audio device to output audio.

7. The method of claim 5, wherein the first audio device is in communication with a fourth audio device, the method further comprising:
 receiving, by the first audio device from the fourth audio device, the audio data; and
 causing the fourth audio device to output audio based on the at least a portion of the audio data.

8. The method of claim 5, further comprising:
 receiving, by the first audio device from the second audio device, a request for one or more portions of the audio data via an access point in communication with the first audio device and the second audio device;
 determining an error rate associated with receipt of data by the second audio device to exceed a threshold error rate; and
 providing, by the first audio device to the second audio device, the one or more portions of the audio data via the access point.

9. The method of claim 5, further comprising:
 receiving, by the first audio device, a command from a control device;
 providing, by the first audio device, a request for the audio data; and
 causing the second audio device to activate a multicast receiver.

10. The method of claim 5, further comprising:
 receiving, by the first audio device, a command from a control device; and
 retrieving, by the first audio device, the at least a portion of the audio data from the first cache responsive to the command.

11. The method of claim 5,
 wherein the providing of the audio data to the second audio device and the third audio device includes:
  providing, by the first audio device, a first portion of the audio data via the multicast transmission;
  receiving, by the first audio device, a first confirmation of receipt of the first portion from the second audio device;
  receiving, by the first audio device, a second confirmation of receipt of the first portion from the third audio device; and
  responsive to receiving both the first confirmation and the second confirmation, providing, with the first audio device, a second portion of the audio data via the multicast transmission.

12. The method of claim 5, further comprising:
 receiving, by the first audio device, a first confirmation from the second audio device indicating receipt of one or more portions of the audio data;
 receiving, by the first audio device, a second confirmation from the third audio device indicating receipt of the one or more portions of the audio data; and
 causing the first audio device to generate a second multicast transmission for receipt by the second audio device and the third audio device.

13. A system comprising:
one or more first memories storing computer-executable instructions; and
one or more first hardware processors to execute the computer-executable instructions to:
cause a master device to transmit data from the master device to a plurality of first slave devices using a multicast transmission;
cause the plurality of first slave devices to receive the data via the multicast transmission;
cause each first slave device of the plurality of first slave devices to store the data in a respective cache;
determine that a particular first slave device of the plurality of first slave devices did not receive at least a subset of the data;
cause the master device to provide the at least a subset of the data to the particular first slave device via an access point in communication with the master device and the particular first slave device; and
cause each first slave device of the plurality of first slave devices to to output content corresponding to at least a portion of the data, wherein each first slave device of the plurality of first slave devices retrieves the at least a portion of the data from the respective cache and outputs the content based on the at least a portion of the data.

14. The system of claim 13, further comprising computer-executable instructions to:
access group data indicative of a relationship between the master device and the plurality of first slave devices; and
configure the master device to retrieve the data from a remote data source, store the data in a local cache, transmit the data using the multicast transmission, and retrieve the at least a portion of the data from the local cache.

15. The system of claim 14, further comprising computer-executable instructions to:
receive a command from a control device, wherein the command indicates the master device and the plurality of first slave devices to be used to output the content; and
generate the group data responsive to the command.

16. The system of claim 13, further comprising computer-executable instructions to:
cause the master device to receive a request for the data from a second slave device via an access point in communication with the master device and the second slave device; and
cause the master device to provide the data to the second slave device via the access point.

17. The system of claim 16, further comprising computer-executable instructions to:
configure the second slave device to provide the data to a plurality of third slave devices using a second multicast transmission; and
cause each third slave device of the plurality of third slave devices to receive the data via the second multicast transmission, store the data in a respective cache, and retrieve the data from the respective cache to output a second portion of the content.

18. The system of claim 13, further comprising computer-executable instructions to:
cause the master device to transmit a first portion of the data to the plurality of first slave devices via the multicast transmission;
cause the master device to receive respective confirmations from each first slave device of the plurality of first slave devices;
cause the master device to determine that the respective confirmation from each first slave device has been received; and
cause the master device to, responsive to the respective confirmation, transmit a second portion of the data to the plurality of first slave devices.

19. The system of claim 13, further comprising computer-executable instructions to:
cause the master device to receive a first confirmation from a first device of the plurality of first slave devices, the first confirmation indicating receipt of one or more portions of the data;
cause the master device to receive a second confirmation from a second device of the plurality of first slave devices, the second confirmation indicating receipt of the one or more portions of the data; and
cause the master device to generate a second multicast transmission for receipt by the first device and the second device.

20. The system of claim 13, further comprising computer-executable instructions to:
determine that an error rate associated with receipt of the at least a subset of the data by the particular first slave device exceeds a threshold error rate, wherein the master device is caused to provide the at least a subset of the data to the particular first slave device via the access point in response to the error rate exceeding the threshold error rate.

* * * * *

UNITED STATES PATENT AND TRADEMARK OFFICE
CERTIFICATE OF CORRECTION

PATENT NO. : 10,341,792 B1
APPLICATION NO. : 15/357579
DATED : July 2, 2019
INVENTOR(S) : Zhang et al.

Page 1 of 1

It is certified that error appears in the above-identified patent and that said Letters Patent is hereby corrected as shown below:

In the Claims

Column 22, Claim 6, Lines 6-7 reads:
"providing, by the first audio device, the audio data to a
fourth audio via an access point in communication with"

When it should read:
--providing, by the first audio device, the audio data to a
fourth audio device via an access point in communication with--

Column 23, Claim 13, Line 21 reads:
"slave devices to to output content corresponding to at"

When it should read:
--slave devices to output content corresponding to at--

Signed and Sealed this
Third Day of September, 2019

Andrei Iancu
*Director of the United States Patent and Trademark Office*